(12) United States Patent
Nielsen et al.

(10) Patent No.: US 7,496,355 B2
(45) Date of Patent: Feb. 24, 2009

(54) CUSTOMISATION OF AN ELECTRONIC DEVICE

(75) Inventors: Peter Dam Nielsen, Lyngby (DK); Christian Kraft, Hvidovre (DK); Francis Djabri, London (GB)

(73) Assignee: Nokia Corporation, Espoo (FI)

( * ) Notice: Subject to any disclaimer, the term of this patent is extended or adjusted under 35 U.S.C. 154(b) by 1127 days.

(21) Appl. No.: 10/608,299

(22) Filed: Jun. 27, 2003

(65) Prior Publication Data
US 2004/0266409 A1 Dec. 30, 2004

(51) Int. Cl.
*H04Q 7/20* (2006.01)
(52) U.S. Cl. .................... 455/414.2; 455/419; 455/425; 455/432.3
(58) Field of Classification Search .............. 455/422.1, 455/426.1, 432.1, 435.1, 456.1, 456.3, 456.6, 455/524–525, 550.1, 562.1, 414.1, 414.2, 455/419, 425, 432.3; 342/357.13; 340/466, 340/936; 701/208
See application file for complete search history.

(56) References Cited

U.S. PATENT DOCUMENTS

| | | | |
|---|---|---|---|
| 5,479,476 A | 12/1995 | Finke-Anlauff | 455/566 |
| 6,549,625 B1 | 4/2003 | Rautila et al. | 380/258 |
| 2001/0024953 A1* | 9/2001 | Balogh | 455/432 |
| 2002/0132610 A1* | 9/2002 | Chaplin et al. | 455/414 |
| 2002/0142788 A1* | 10/2002 | Chawla et al. | 455/504 |
| 2003/0017848 A1 | 1/2003 | Engstrom et al. | 455/558 |
| 2004/0104842 A1* | 6/2004 | Drury et al. | 342/357.13 |
| 2004/0216054 A1* | 10/2004 | Mathews et al. | 715/765 |
| 2006/0148522 A1* | 7/2006 | Chipchase et al. | 455/557 |

FOREIGN PATENT DOCUMENTS

WO   WO 2004/040923   5/2004

* cited by examiner

*Primary Examiner*—Binh K Tieu
(74) *Attorney, Agent, or Firm*—Perman & Green, LLP

(57) ABSTRACT

The operation of a mobile electronic device is controlled at least partially in accordance with operating characteristics adopted while the phone is at a first location. The operation of a mobile electronic device is controlled at least partially in accordance with a theme that how an electronic device responds to user input.

37 Claims, 1 Drawing Sheet

CUSTOMISATION OF AN ELECTRONIC DEVICE

FIELD OF THE INVENTION

Embodiments of the present invention relate to the customisation of an electronic device, such as a mobile cellular telephone.

BACKGROUND OF THE INVENTION

U.S. Pat. No. 5,479,476 describes a mobile cellular telephone that has a plurality of user adjustable operating characteristics such as the sound volume, the ringing tone type, and whether features such as key tones, warning tones, lights and call transfer are on or off. The user can adjust the operating characteristics of the phone en masse by selecting one of a plurality of groups of pre-set values for the operating characteristics.

US 2003/0017848 describes personalizing an electronic device by attaching one of a number of different interchangeable covers, each of which has its own theme. Each cover has an embedded electronic component that provides theme oriented features in the electronic device. The theme oriented features may include a ring tone, games, a screen saver, and a default voice mail greeting. The embedded electronic component may also transfer to the electronic device names, phone numbers, resource server specifications, email addresses, and media content such as animation, audio or video. Interchanging covers of the electronic device changes the theme of the electronic device.

These documents describe the customisation of an electronic device, such as a mobile cellular telephone, by varying the manner of presentation by the device and the data available for use in the device.

The documents do not however address a current problem in mobile electronic devices. As mobile electronic devices get smaller and more feature rich, they become increasing more difficult to use. In particular, the menu of a device becomes complex and difficult to navigate. This is exacerbated when the menu is designed as a 'flat' hierarchy so that all menu options are accessible within a minimum number of keystrokes.

BRIEF SUMMARY OF THE INVENTION

According to one aspect of the present invention there is provided a mobile electronic device comprising: a memory for associating a first location with a first plurality of operating characteristics; detection means for automatically detecting when the mobile device is at the first location; adoption means for adopting the first plurality of operating characteristics when the mobile device is at the first location; and a controller, for controlling the operation of the electronic device at least partially in accordance with the adopted operating characteristics.

According to another aspect of the present invention there is provided a method of customising a mobile electronic device, comprising the steps of:

associating a first plurality of operating characteristics for the mobile device with a first location;

detecting the location of the mobile electronic device; adopting the first operating characteristics in the mobile electronic device when it is located at the first location; and controlling the operation of the mobile electronic device at least partially in accordance with the adopted operating characteristics.

According to a further aspect of the present invention there is provided an electronic device, having a plurality of user selectable options, comprising:

a user interface having a display and a user input device;

a memory for defining a first theme and a second theme, wherein the first theme defines how an electronic device is controlled by the user input to select an option when the first theme is adopted by the electronic device and the second theme defines how an electronic device is controlled by the user input to select an option when the second theme is adopted by the electronic device;

selection means for selecting said first theme or said second theme for adoption by the electronic device; and a controller, for controlling the operation of the electronic device at least partially in accordance with the adopted one of the themes.

According to another aspect of the present invention there is provided a method of customising the manner in which an electronic device, having a plurality of user selectable options, is controlled by a user to select an option, comprising the steps of: providing a first theme defining how an electronic device is controlled by a user to select an option when the first theme is adopted by the electronic device; providing a second theme that defines how an electronic device is controlled by the user to select an option when the second theme is adopted by the electronic device; and selecting the first theme or the second theme for adoption by the electronic device.

According to another aspect of the present invention there is provided a mobile electronic device, having a plurality of user selectable options, comprising:

a user interface having a display and a user input device; a memory for associating a first theme with a first location, wherein the first theme defines how an electronic device is controlled by the user input to select an option when the first theme is adopted by the electronic device; detection means for automatically detecting when the mobile device is at the first location; selection means for selecting said first theme for adoption by the electronic device when the mobile device is at the first location; and a controller, for controlling the operation of the electronic device at least partially in accordance with an adopted theme.

According to another aspect of the invention there is provided a method of customising the manner in which an electronic device, having a plurality of user selectable options, is controlled by a user to select an option, comprising the steps of: providing a first theme defining how an electronic device is controlled by a user to select an option when the first theme is adopted by the electronic device; detecting when the mobile electronic device is at a first location; and adopting the first theme when the mobile electronic device is located at the first location.

BRIEF DESCRIPTION OF DRAWINGS

For a better understanding of the present invention reference will now be made by way of example only to the accompanying drawings in which.

DETAILED DESCRIPTION OF EMBODIMENT(S) OF THE INVENTION

Figure 1:
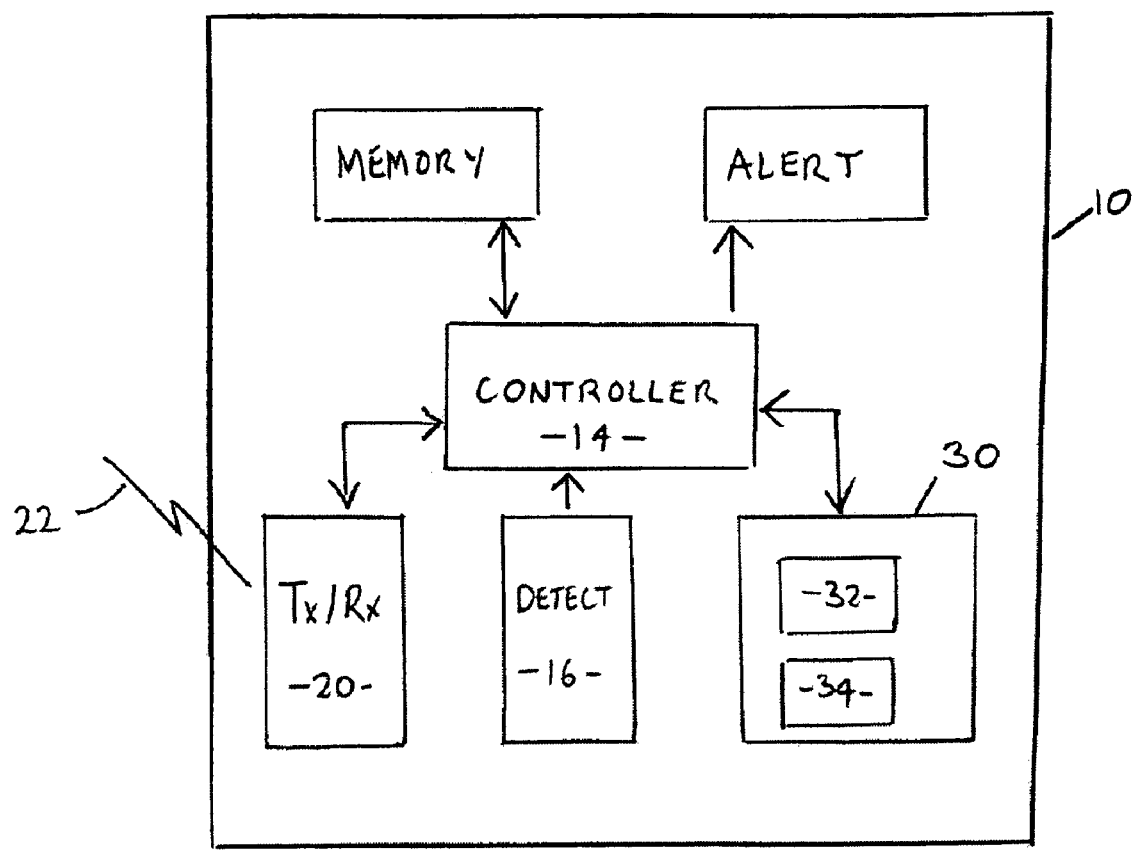
FIG. 1 illustrates a mobile electronic device.

FIG. 1 illustrates a mobile electronic device 10 that can be customized to have a particular set of operational characteristics by the adoption of a particular theme.

A theme is data and/or programming instructions defining a set of operating characteristics for the mobile electronic device. When the mobile electronic device adopts a theme it adopts the operating characteristics of that theme.

A theme may affect the form of the adopting device. 'Form' is this context means the manner of presentation by the adopting device and includes aesthetic aspects, for example, color scheme, wallpaper, screen saver and icons, and behavioral aspects, for example, the type and volume of alerts used by the device.

A theme may affect the content of the adopting device. 'Content' is this context means data available for use in the device and includes software applications, for example games, and application data, for example, reminder/calendar notes, contact information, URLs, bookmarks etc that are used in existing software applications.

A theme may affect the control of the adopting device. 'Control' in this context means how the device is controlled by the user input to select an option such as a function, setting or application. The adoption of such a control theme may for example, modify the menu structure of the device. This may improve the accessibility of particular options to a user or may add or subtract options.

The modification of the menu structure may result in a change to the hierarchical structure to the menu so that the user has to perform a first series of keystrokes to choose a particular menu option when a first theme is adopted but has to perform a second, different series of keystrokes to choose the same menu option when a second theme is adopted. Certain options that are likely to be used when the device has adopted a first theme may be promoted to a higher level in the menu structure so that they can be chosen with fewer keystrokes while other options which are unlikely to be used when the device has adopted the first theme may be demoted to a lower level of the menu structure.

The modification of the menu structure may also result in a different menu content such that the menu structures for different themes have different options available for selection by the user.

Thus applications resident in the mobile electronic device may be hidden to a user on adopting a theme by adapting the menu structure.

FIG. 1 illustrates the mobile electronic device 10, in this example a mobile cellular telephone, comprising: a memory 12, a controller 14, a location detector 16, an alert device 18, a radio transceiver 20 and a user interface 30.

The controller 14 is connected to read from and write to memory 12. It is connected to receive inputs from each of the user interface 30, the location detector 16 and the radio transceiver 20. It is connected to provide output to the user interface 30, the alert device 18 and the radio transceiver 29. The controller 14 is a programmed processor and the operation of the mobile electronic device, as described, is determined by the program instructions loaded into the processor, for example, from a computer program embodied on a record carrier.

The user interface 30 includes a display 32 and a user input device 34. The display is controlled by controller 14 to display a menu that enables the operation of the mobile electronic device 10 by a user. The menu is hierarchical structure that includes a plurality of user selectable options. The user input device 34 may be used to navigate through the hierarchical structure to find and select a desired option.

The alert device 18 is controlled by the controller 14 to gain the attention of the user. The alert device may be a loud speaker that is capable of producing ring tones or it may be a vibrator capable of vibrating the mobile electronic device 10.

The location detector 16 is capable of automatically detecting the location of the mobile electronic device. It may be, for example, a Global Positioning System (GPS) chip. Alternatively, it may determine the identification of the cell (cell ID) in which the mobile cellular telephone 10 is location from the communications received at the radio transceiver 20. The detector provides the detected position to the controller 14. The position may be a relative position such as a cell ID or an absolute position such as a grid reference.

The memory 12 contains a database of themes. The database stores a plurality of themes including a first theme and a second theme.

The first theme defines a first set of operating characteristics for the mobile electronic device, that are adopted when the mobile electronic device 10 adopts the first theme. The second theme defines a second, different set of operating characteristics for the mobile electronic device, that are adopted when the mobile electronic device 10 adopts the second theme.

The database also stores a plurality of location identifiers including first location identifier(s) and second location identifier(s). The first and second locations are mutually exclusive.

The database has a first association between the first location identifier(s) and the first theme and a second association between the second location identifier(s) and the second theme.

An interrogation of the database using the first location identifier or one of the first location identifiers returns the first theme and an interrogation using the second location identifier or one of the second location identifiers returns the second theme.

The mobile electronic device 10 is operable to automatically adopt the first theme when the mobile electronic device 10 is at the first location and to automatically adopt the second theme when the mobile electronic device 10 is at the second location. Thus the form and/or content and/or control of the mobile electronic device 10 may be optimized for location. In particular the menu may be optimised for the location.

The controller 14 receives the location identifier from the location detector 16 and interrogates the database in the memory 12.

If the mobile electronic device 10 is located at the first location, the database returns the first theme, which is automatically adopted by the controller 14. The operation of the electronic device 10 is then controlled at least partially in accordance with the adopted operating characteristics of the first theme. If the mobile electronic device is not located at the first location, the first theme is not adopted and the default theme remains in use.

If the mobile electronic device 10 is located at the second location, the database returns the second theme, which is automatically adopted by the controller 14. The operation of the mobile electronic device 10 is then controlled at least partially in accordance with the adopted operating characteristics of the second theme. If the mobile electronic device 10 is not located at the second location, the second theme is not adopted and the default theme remains in use.

The mobile electronic device 10 is operable to automatically un-adopt an adopted theme when the mobile device leaves the location(s) associated with the presently adopted theme. The controller 14 receives the location identifier from the location detector 16 and interrogates the database in the memory 12. If the mobile electronic device 10 has, for example left the first location while adopting the first theme, the database returns a null value and the default theme is adopted replacing the first theme. If the mobile electronic device 10 has, for example left the first location while adopting the first theme and entered the second location, the database returns the second theme which is adopted replacing the first theme.

The mobile electronic device 10 may additionally or alternatively be operable to adopt a theme in response to user action instead of location. For example, a user may select one of a plurality of available themes from the menu.

The radio transceiver 20 may be used to download themes to the mobile electronic device 10. The themes are downloaded as a data structure 22.

An example application of the electronic device 10 will now be described. As a user enters a fun park with a theme such as Disney World™, the user's mobile cellular telephone is either pushed with a fun park theme or is instructed to download a fun park theme. The fun park theme consists of, for example, Mickey Mouse™ wallpaper for the telephone, the signature tune from Little Mermaid™ as a ringing tone, a game including a Donald Duck™ game in which the user can win a prize and a complete schedule of the special attractions and shows available that day (and perhaps the next few days as well), and a listing of the up and coming attractions that is stored in the telephone's Calendar application. When the user exits the fun park, the telephone prompts the user whether or not to return to the telephones original theme. As a season ticket holder enters the fun park, the users telephone senses that it is entering and downloads the week's theme consisting of wallpaper, color scheme, game, reminders, ringing tone etc. As the user exits, the user is prompted whether to keep or delete the new theme. In both of these cases it is possible to have new contacts added to the telephones list of telephone numbers, either in order or at the top. These new contacts could include the 'lost and found' department, an information center and an emergency center. The user interface of the telephone could also be changed to make certain applications or data more accessible.

Although embodiments of the present invention have been described in the preceding paragraphs with reference to various examples, it should be appreciated that modifications to the examples given can be made without departing from the spirit and scope of the invention.

What is claimed is:

1. An apparatus comprising:
   a memory for associating a first location with a first plurality of operating characteristics, a first modified menu structure, and first contact information;
   a detector for automatically detecting when the apparatus is at the first location; and
   a controller configured to adopt the first plurality of operating characteristics, the first modified menu structure, and first contact information when the apparatus is at the first location, and for controlling the operation of the apparatus at least partially in accordance with the adopted first plurality of operating characteristics, the first modified menu structure, and first contact information.

2. The apparatus of claim 1, wherein the controller is configured to automatically adopt the first plurality of operating characteristics, the first modified menu structure, and first contact information when the apparatus is at the first location.

3. The apparatus of claim 1, wherein the controller is configured to un-adopt the first plurality of operating characteristics, the first modified menu structure, and first contact information when the apparatus is no longer at the first location.

4. The apparatus of claim 1, wherein the first operating characteristics determine at least partially the form of output presentable by the apparatus.

5. The apparatus of claim 4, wherein the first operating characteristics define at least one of the colors, wall paper, background, or screen saver used.

6. The apparatus of claim 4, further comprising an alert device, wherein the first operating characteristics define at least one operating characteristic of the alert device.

7. The apparatus of claim 1, wherein the first operating characteristics configure application data available for use by the apparatus.

8. The apparatus of claim 7, wherein the first operating characteristics include a software application.

9. The apparatus of claim 7, wherein the first operating characteristics include additional data for a software application.

10. The apparatus of claim 1, wherein the memory is additionally configured for associating a second location, exclusive of the first location, to a second plurality of operating characteristics, second modified menu structure, and second contact information, different from the first plurality of operating characteristics, first modified menu structure, and first contact information, and the controller is configured to adopt the second plurality of operating characteristics, second modified menu structure, and second contact information when the apparatus is at the second location.

11. The apparatus of claim 1, further comprising a user interface having a display and a user input device, wherein the first plurality of operating characteristics are themed, and define how an apparatus responds to user input.

12. The apparatus of claim 11, wherein the display is for displaying the first modified menu structure including a plurality of user selectable options, and the user input device is for navigating the displayed first modified menu structure to select an option and wherein the first plurality of operating characteristics defines the first modified menu structure, such that when a first theme is adopted, the first modified menu structure is displayable.

13. A method comprising:
   associating a first location of an apparatus with a first plurality of operating characteristics, a first modified menu structure, and first contact information;
   automatically detecting when the apparatus is at the first location;
   adopting the first plurality of operating characteristics, the first modified menu structure, and first contact information in the apparatus when the apparatus is located at the first location; and
   controlling the operation of the apparatus at least partially in accordance with the adopted first operating characteristics, the first modified menu structure, and first contact information.

14. A computer program product embodied on a computer readable medium comprising programming instructions for performing the method of claim 13.

15. The method of claim 13, further comprising automatically adopting the first plurality of operating characteristics and the first modified menu structure when the apparatus is at the first location.

16. The method of claim 13, further comprising un-adopting the first plurality of operating characteristics and the first modified menu structure when the apparatus is no longer at the first location.

17. The method of claim 13, wherein the operating characteristics determine at least partially the form of output presentable by the apparatus.

18. The method of claim 13, wherein the operating characteristics define at least one of the colors, wall paper, background, or screen saver used.

19. The method of claim 13, further comprising defining at least one operating characteristic of an alert device of the apparatus using the operating characteristics.

20. The method of claim 13, further comprising configuring application data available for use by the apparatus using the operating characteristics.

21. The method of claim 13, further comprising associating a second location, exclusive of the first location, to a second plurality of operating characteristics, a second modified menu structure, and second contact information, different from the first plurality of operating characteristics, first modified menu structure, and first contact information, and adopting the second plurality of operating characteristics when the apparatus is at the second location.

22. The method of claim 13, further comprising:
displaying the first modified menu structure including a plurality of user selectable options, and
navigating the displayed first modified menu structure to select an option.

23. An electronic device, having a plurality of user selectable options, comprising:
a user interface having a display and a user input device;
a memory for defining a first theme and a second theme, wherein the first theme defines a first user selectable menu structure and first contact information, and how the electronic device is controlled by the user input to select an option when the first theme is adopted by the electronic device and the second theme defines a second user selectable menu structure and second contact information, and how the electronic device is controlled by the user input to select an option when the second theme is adopted by the electronic device; and
a controller for selecting said first theme or said second theme for adoption by the electronic device and for controlling the operation of the electronic device at least partially in accordance with the adopted one of the themes.

24. An electronic device as claimed in claim 23, wherein the display is for displaying a menu including a plurality of user selectable options and an user input device is for navigating the displayed menu to select an option such that when the first theme is adopted, the first user selectable menu and first contact information are displayable and when the second theme is adopted, the second user selectable menu and second contact information are displayable.

25. An electronic device as claimed in claim 24, wherein the operating characteristics controls at least partially the applications provided by the device.

26. An electronic device as claimed in claim 25, wherein the operating characteristics include a software application.

27. An electronic device as claimed in claim 25, wherein the operating characteristics include additional data for a software application.

28. An electronic device as claimed in claim 23, wherein the first theme defines a first plurality of operating characteristics and the second theme defines a second plurality of operating characteristics.

29. An electronic device as claimed in claim 28, wherein the operating characteristics determine at least partially the form of output presentable by the electronic device.

30. An electronic device as claimed in claim 29, further comprising an alert device, wherein the operating characteristics define at least one operating characteristic of the alert device.

31. An electronic device as claimed in claim 23 wherein the controller for selecting said first theme or said second theme for adoption by the electronic device is configured to associate the first theme with a first location, determine the location of the electronic device, and adopt the first theme when the electronic device is located at the first location.

32. An electronic device as claimed in claim 31, wherein the controller is configured to associate the second theme with a second location and to adopt the second theme when the electronic device is located at the second location.

33. An electronic device as claimed in claim 23, wherein the controller for selecting said first theme or said second theme for adoption by the electronic device is responsive to the user input device.

34. A method of customizing the manner in which an electronic device, having a plurality of user selectable options, is controlled by a user to select an option, comprising:
providing a first theme defining a first modified menu structure and first contact information, and how an electronic device is controlled by a user to select an option when the first theme is adopted by the electronic device;
providing a second theme that defines a second modified menu structure and second contact information, and how an electronic device is controlled by the user to select an option when the second theme is adopted by the electronic device; and
selecting the first theme or the second theme for adoption by the electronic device.

35. A computer program embodied on a computer readable medium comprising programming instruction, when executed by a computer processor, for performing the method as claimed in claim 34.

36. A mobile electronic device, having a plurality of user selectable options, comprising:
a user interface having a display and a user input device;
a memory for associating a first theme, a first modified menu structure, and first contact information with a first location, wherein the first theme defines how an electronic device is controlled by the user input to select an option when the first theme is adopted by the electronic device;
a detector for automatically detecting when the mobile device is at the first location; and
a controller for selecting said first theme for adoption by the electronic device when the mobile device is at the first location and for controlling the operation of the electronic device at least partially in accordance with the adopted first theme, the first modified menu structure, and first contact information.

37. A method of customizing the manner in which an electronic device, having a plurality of user selectable options, is controlled by a user to select an option, comprising:
providing a first theme, a first modified menu structure, and first contact information defining how an electronic device is controlled by a user to select an option when the first theme is adopted by the electronic device;
detecting when the mobile electronic device is at a first location; and
adopting the first theme, the first modified menu structure, and first contact information when the mobile electronic device is located at the first location.

* * * * *